May 29, 1962 P. L. SIGMON 3,036,941
OPPOSED DECAL TRANSFER APPARATUS AND METHOD
Filed Sept. 5, 1957 5 Sheets-Sheet 2
FIG. 2.
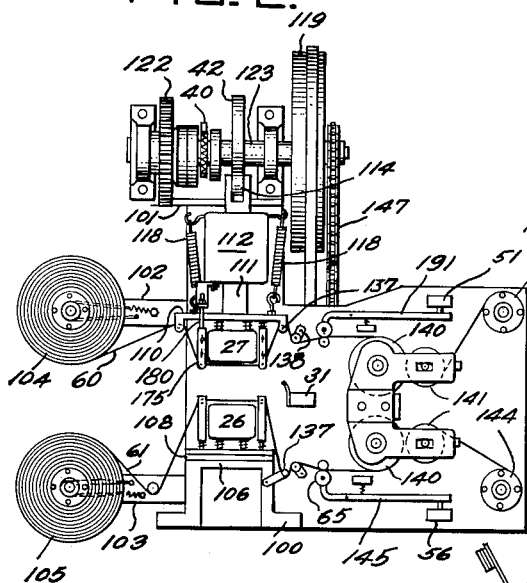
FIG. 3.
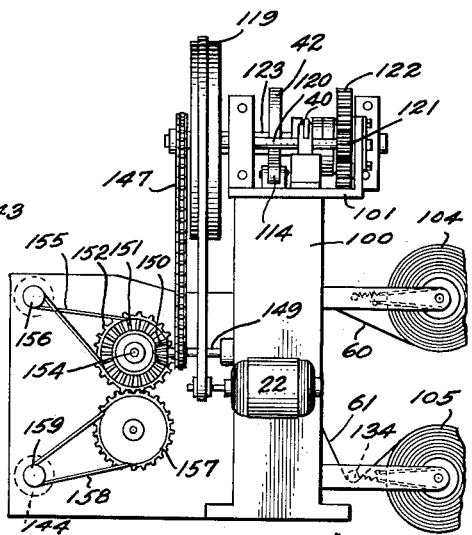
FIG. 1B.
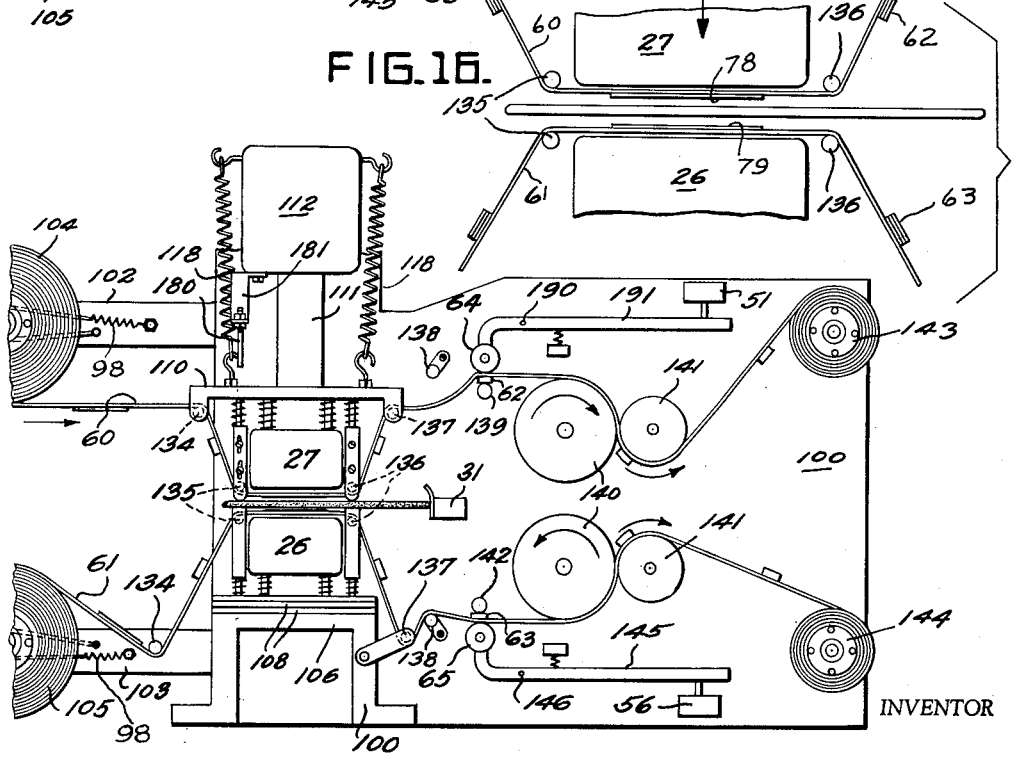
FIG. 4.
INVENTOR
PAUL L. SIGMON
BY Richard L. Underwood
ATTORNEY May 29, 1962 P. L. SIGMON 3,036,941
OPPOSED DECAL TRANSFER APPARATUS AND METHOD
Filed Sept. 5, 1957 5 Sheets-Sheet 3
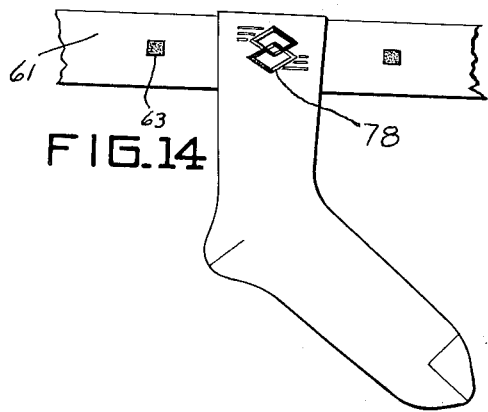
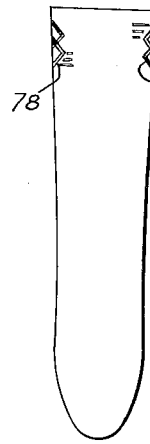
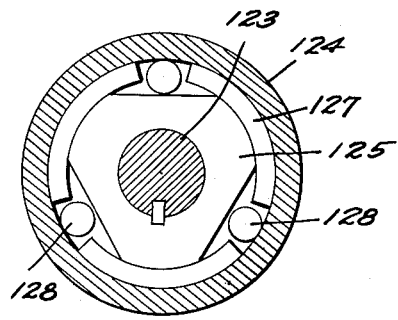
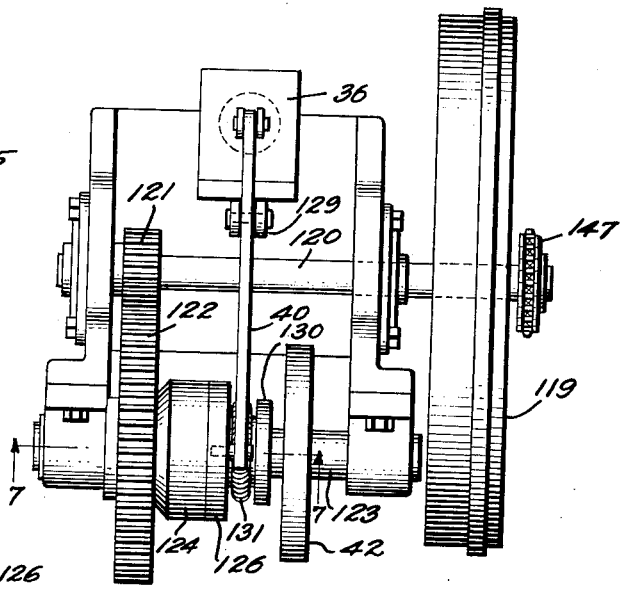
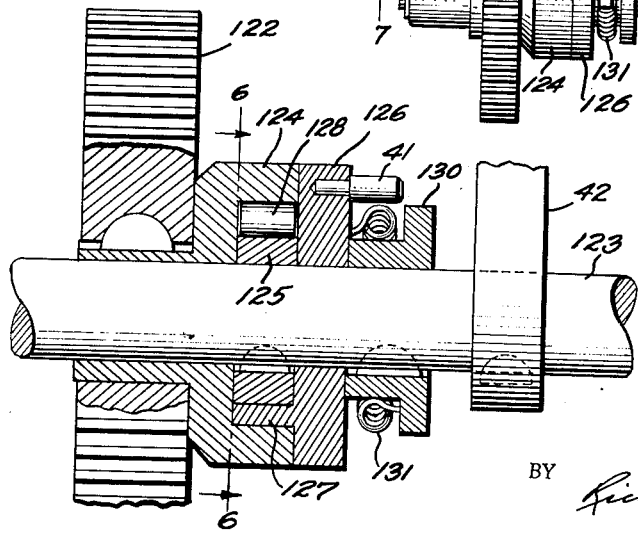
INVENTOR
PAUL L. SIGMON
BY Richard L. Underwood
ATTORNEY May 29, 1962 P. L. SIGMON 3,036,941
OPPOSED DECAL TRANSFER APPARATUS AND METHOD
Filed Sept. 5, 1957 5 Sheets-Sheet 4
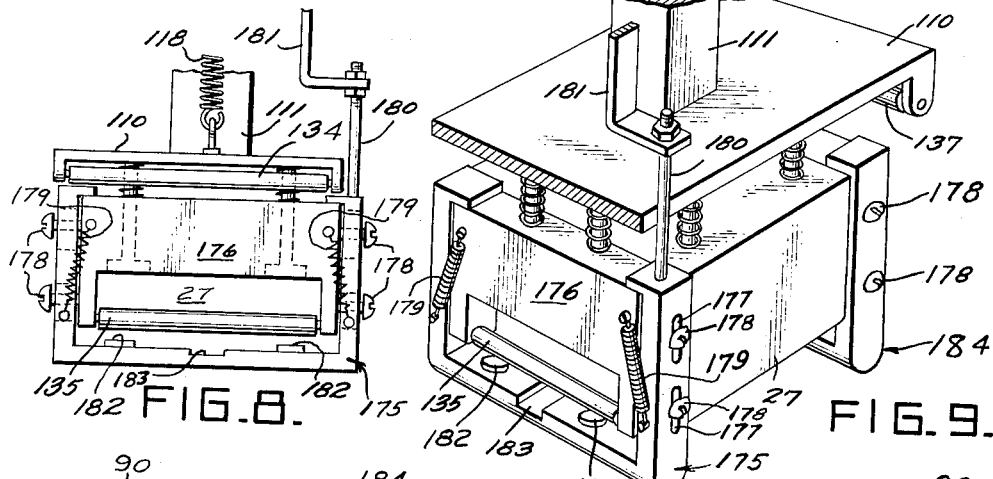
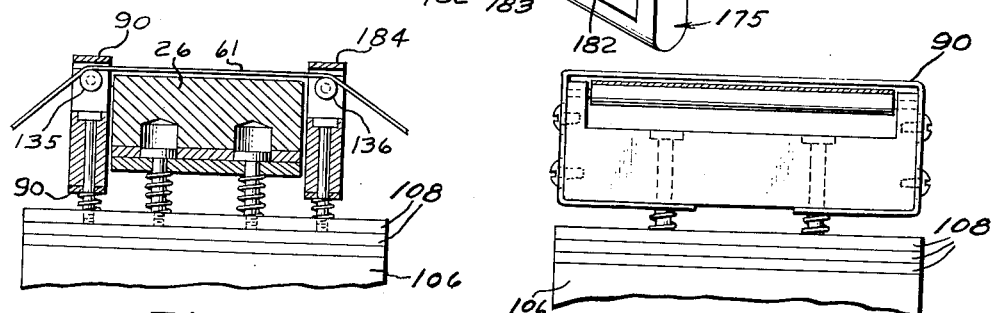
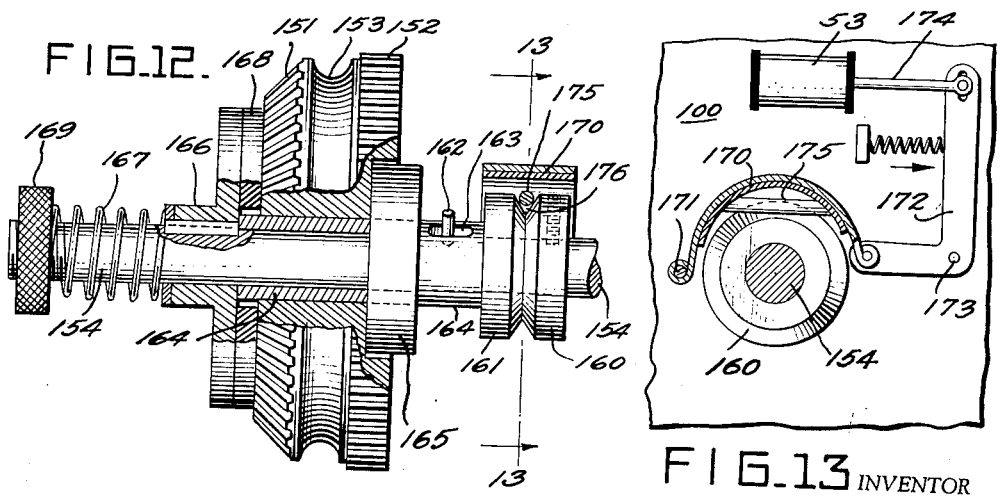
INVENTOR
PAUL L. SIGMON
BY Richard L. Underwood
ATTORNEY

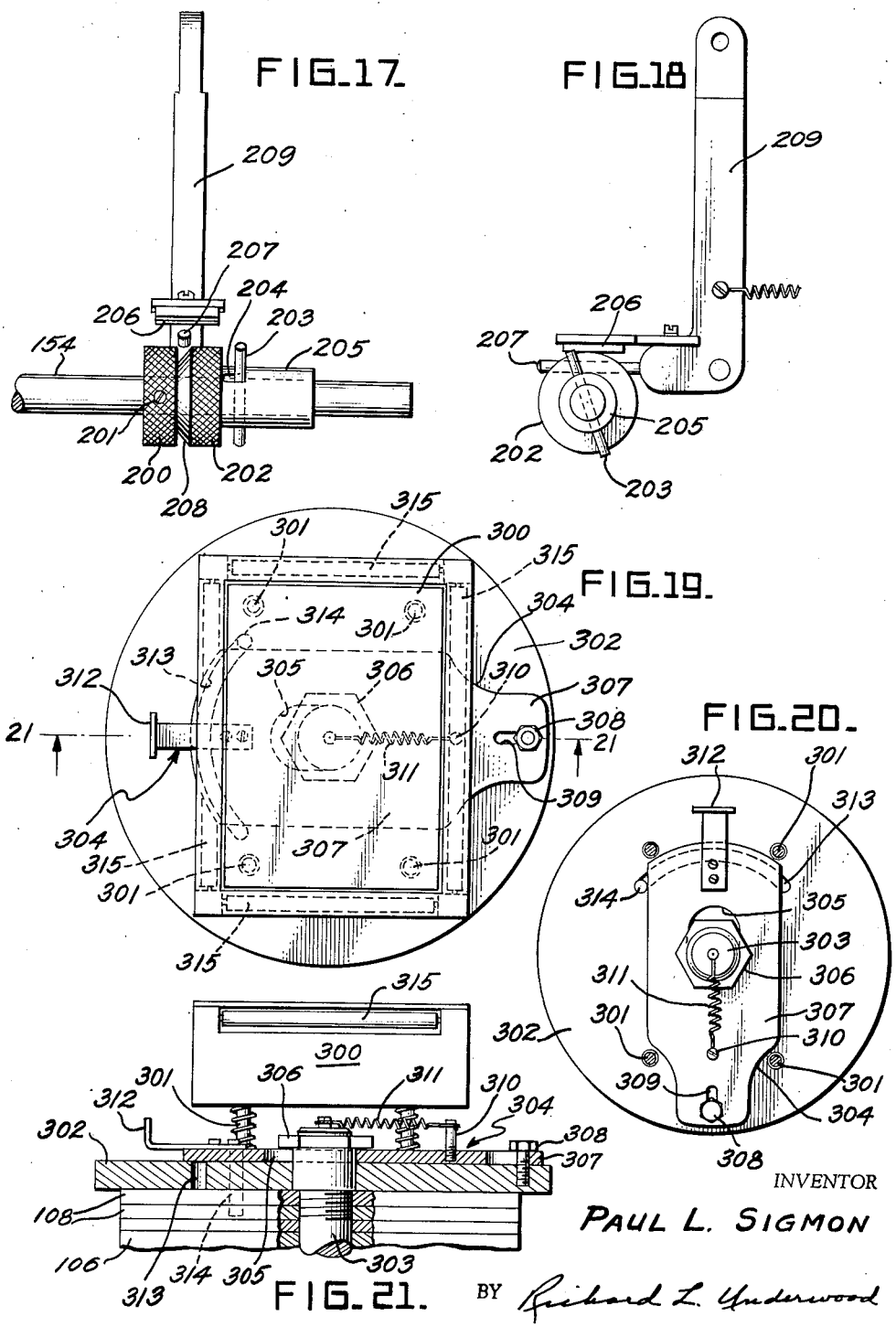

United States Patent Office 3,036,941
Patented May 29, 1962

3,036,941
OPPOSED DECAL TRANSFER APPARATUS
AND METHOD
Paul L. Sigmon, P.O. Box 393, Hickory, N.C.
Filed Sept. 5, 1957, Ser. No. 682,106
4 Claims. (Cl. 156—361)

This invention relates to a machine for applying indicia simultaneously to opposed sides of an article. While this application is intended to relate to all types of articles, the explanation will be directed to socks.

A major factor today in the manufacture of socks is the application of various information and design indicia to the socks by a manual operation involving the use of heat irons and transfer strips carrying the desired indicia. Only one side of an article receives an indicium at a time. Accurate alignment of a second indicium with the previously applied indicium on the opposite side of a sock is a function of the skill of the operator. The instant invention provides an apparatus and method whereby perfect alignment and simultaneous application of the indicium to both sides of a sock can be accomplished.

The transfer strips used consist of a carrier paper and a thermoplastic material such as ink adhered to the paper. Upon the application of heat, the ink melts and is transferred to the sock. The transfer strip is a standard item and is manufactured by passing a paper strip over printing rolls which apply the ink, a number of rolls being employed when multicolors are desired, one roll for each color. This invention preferably utilizes a transfer strip manufactured in a manner such that an ink control spot is applied to the strip by the same roll which applies the ink of the indicium. If a control spot of multiple ink layers is desired, an added layer can be applied. If the indicium is multicolor, the added layers can be applied by the same rolls which apply ink to the indicium. Variations in length of paper due to humidity conditions and the like are thereby reduced to a minimum since the control spot or signal is always reasonably close to its particular indicium and has been applied to the strip in a precision-like fashion in relation to its indicium. The transfer strip-making machine may slip in its transmission of paper, thereby causing an increasing variation in distance between the transfers early in the run and late in the run. This will not affect the distance between a control signal and an adjacent transfer as they are applied at the same time, and the distance therebetween is a function of a single printing roll.

The apparatus and method of this invention employ such transfer strips by passing an upper strip and a lower strip between stamping elements, then to separate sensing device, then to separate drive means, and then to separate take-up rolls. As each transfer strip is moved, a separate sensing system recognizes a control spot and applies a brake on the driving system in response to this identification, to place an indicium at its respective stamping element. This action takes place at both upper and lower strips which are operated independently of each other. No accumulation of error in identification is possible since each control spot is in effect an integral part of a particular indicium since they were applied to the transfer strip by a single roll.

Various other objects and meritorious features of the invention will be apparent from the following description taken in conjunction with the drawings wherein like numerals refer to like parts throughout the several figures and wherein:

FIG. 2 is a front elevation of the apparatus;

FIG. 3 is a rear elevation of FIG. 2 with certain parts removed for clarity;

FIG. 4 is an enlarged view of the lower portion of FIG. 2;

FIG. 5 is a top view of FIG. 2 showing the stamping element movement system;

FIG. 6 is a sectional view taken on line 6—6 of FIG. 7;

FIG. 7 is a sectional view taken on line 7—7 of FIG. 5;

FIG. 8 is an upstream end view of the upper stamping element and associated structure;

FIG. 9 is a perspective view of FIG. 8;

FIG. 10 is a sectional front view of the lower stamping element 26 and associated structure;

FIG. 11 is a side view of the lower stamping element of FIG. 10;

FIG. 12 is a sectional-type view of the brake and clutch mechanism;

FIG. 13 is a view taken on line 13—13 of FIG. 12;

FIG. 14 is a top view showing a transfer strip and a sock;

FIG. 15 is a front view of the sock with indicia on opposite sides;

FIG. 16 is an enlarged view of the stamping elements and the transfer strip;

FIG. 17 is a view showing a modified brake structure;

FIG. 18 is a side view of FIG. 17;

FIG. 19 is a top view showing a rotatable table for a lower stamping element;

FIG. 20 is a top view similar to FIG. 19 without stamping element removed and the table rotated at 90°; and FIG. 21 is a sectional side view taken on line 21—21 of FIG. 19.

Figure 1:
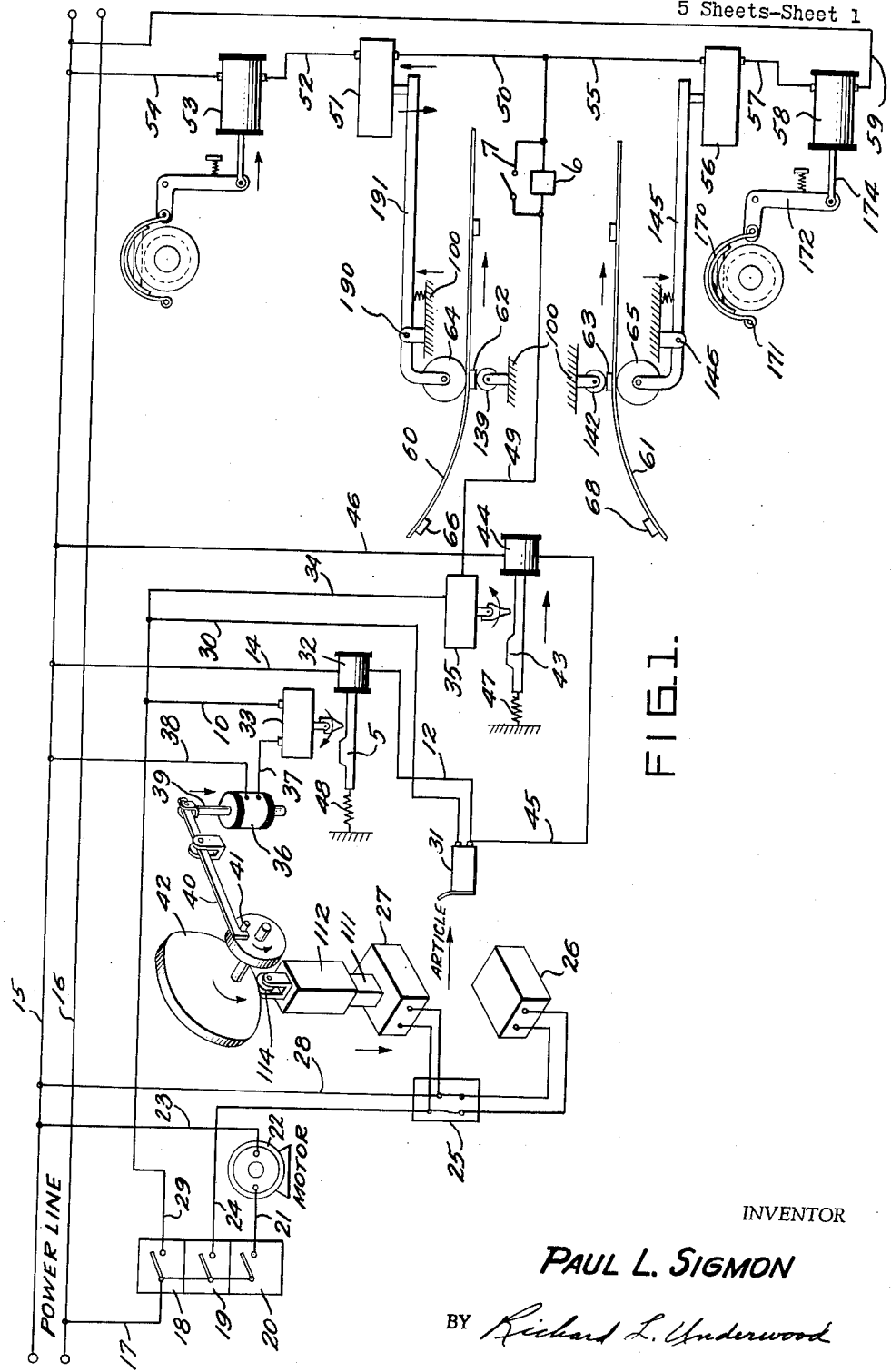
FIG. 1 is a schematic diagram showing the electrical control system involved along with representations of the critical mechanisms.

Each strip 60 or 61 (FIGS. 4 and 16) is made of a carrier on which indicium 78 or 79 is placed at spaced intervals. Control signals, such as 62 and 63, are also present, there being a separate control signal for each indicium and each control signal being spaced on the strip the same distance from its indicium. Ink indicia are preferably registered with the face of their stamping element by the sensing of an ink control signal applied to the strip in the same fashion as the indicia, as described above. With certain indicia designs the control signal is spaced downstream on the strip and controls the second indicium upstream therefrom; such an arrangement will be described. In any design, however, where the control signal is the same material as the indicium, the control signal is preferably downstream of its indicium.

Referring now to FIG. 1, it will be seen that the syster is electrically connected to main power lines 15 and 16. A wire 17 connects power line 16 to a control panel having three switches 18, 19 and 20, the power being taken into the control switch 18 and from there to the heater switch 19 and then to the motor switch 20.

The motor circuit includes a motor 22 with a wire 21 leading from the motor switch 20 to the motor 22 and a wire 23 leading from the other terminal of the motor to the main power line 15.

The heater circuit includes the heater switch 19, a line 24 leading to a heater plug-receiving socket 25, this socket being a type which receives two male plugs from the two stamping elements 26 and 27, and a return line 28 connected to main power line 15.

The control circuit includes in part the control switch 18 and a line 29 having three tap lines, one line 30 leading to the trigger switch 31, a second line 10 leading to the clutch release switch 33, and a third line 34 leading to a circuit breaker or neutralizer switch 35.

The trigger switch 31 when tripped causes relative movement between the stamping elements 26 and 27. Preferably switch 31 is adjustably placed adjacent the fixed lower element 26 and is tripped closed by an article placed between the stamping elements by hand or by automatic delivery apparatus. It will be appreciated that switch 31 could also be operated in many other fashions, such as by a separate action of the operator of the machine.

The trigger switch 31, when tripped, connects solenoid 32 across the main power lines through lines 12 and 14, thereby moving cam bar 5 to the right in FIG. 1 to close clutch release switch 33. When switch 33 is closed, solenoid 36 is connected across the main power lines through lines 37 and 38, thereby drawing rod 39 downwardly (FIG. 1) to lift latch 40 clear of clutch pin 41 resulting in reciprocation of stamping element 27 by cam 42, as will be further explained hereinafter. Cam bar 5 trips clutch release switch 33 into closed condition only long enough to allow the one-revolution clutch pin 41 to pass under latch 40, the length of the raised camming surface or bar 5 being designed to hold switch 33 closed on its movement to the right for the desired period only. When switch 33 is open, latch 40 can drop downward of its own weight into position for stopping clutch pin 41 after one revolution thereof and one reciprocation of the stamping element through the pressing cycle.

Further, when trigger switch 31 is closed, solenoid 44 is connected across the main power lines by lines 45 and 46. This causes the operating cam bar 43 for the circuit breaker or safety switch 35 to move to the right into cocked position. Safety switch 35 is a circuit breaker for the sensing system and is normally in closed position. Movement to the right of cam bar 43 does not open safety switch 35 due to the knuckling action of switch 35 as shown by arrow in FIG. 1; movement to the right cocks cam bar 43 for return movement to the left by spring 47 when solenoid 44 is de-energized.

After the pressing cycle during which indicia are applied to both sides of an article, the article is removed from between the stamping elements 26 and 27, and trigger switch 31 is opened. Solenoid 32 is thereby de-energized and cam bar 5 is moved to the left to its original position shown in FIG. 1 by the spring 48. Clutch release switch 33 is not closed by this movement to the left of cam bar 5 because the switch 33 knuckles as shown by the arrow in FIG. 1 to allow the bar 5 to pass without closing the switch.

Removal of the article and resultant opening of trigger switch 31 also de-energizes solenoid 44, allowing spring 47 to pull cam bar 43 to the left back to its original position shown in FIG. 1, this causing the opening of safety switch 35 for a short time period controlled by the length of the raised camming surface on bar 43. Opening switch 35 allows advancement of strips 60 and 61, as will be explained.

Safety switch 35 is connected by line 49 to the sensing system which controls proper registration of indicia at the faces of the stamping elements 26 and 27. Tap line 50 connects line 49 to sensing switch 51, line 52, brake solenoid 53 and line 54 which connects with main power line 15. Similarly, tap line 55 connects line 49 to sensing switch 56, line 57, brake solenoid 58 and line 59 which connects with main power line 15.

A neutralizer switch 6 is connected in series in line 49 to control accurately the time period of deenergization of the sensing system. When the safety switch 35 is opened, the neutralizer switch 6 starts measuring the pre-set time delay before causing the sensing system to be reenergized. The neutralizer switch 6 may be of a type presently available on the market from the Elastic Stop Nut Corp. of America, sold under the trademark "Agastat." An interval from 0.10 second to 3 seconds has been found satisfactory under most conditions; larger intervals of 10 seconds may be employed if necessary.

Breaking the circuit to the sensing system for a predetermined period enables the moving means to advance the strips 60 and 61 a distance sufficient to remove the control signals 62 and 63 out of range of and contact with their respective sensing fingers or means 64 and 65.

Should neutralizer switch 6 break down, the cam bar 43 will provide a time delay in accordance with the length of the raised camming surface on bar 43. A parallel switch by-pass 7 enables removal and replacement of the neutralizer switch 6 without stopping the machine. The cam bar 43 will then provide a time delay which though shorter in length than that provided by the neutralizer switch, will enable temporary operation of the machine. Foolproof and rapid operation is more readily attained by using the neutralizer switch 6. Safety switch 35 and neutralizer switch 6 can serve independently as or as components of a neutralizing means.

The entire system is now in condition for applying indicia to another article placed between the stamping elements 26 and 27.

It will be recognized that each strip 60 or 61 can be independently advanced by manually tripping sensing switch 51 or 56 thereby releasing the brake solenoids 53 and 58, respectively.

*Mechanism for Relative Movement of Stamping Elements Through Pressing Cycle*

Referring now specifically to FIGS. 2, 3 and 4, it will be seen that the machine structurally comprises a main frame 100, at the top of which is rigidly secured a top bearing bracket 101, the main frame including an upper supply arm 102 and a lower supply arm 103 for holding strip rolls 104 and 105, respectively. The main frame 100 is equipped with an elevated base 106 upon which is mounted the lower stamping element 26, suitable adjustable spacers 108 (FIG. 10) being provided to adjust the height of the fixed element 26.

The upper stamping element 27 is mounted on a plate 110 which is in turn mounted on a ram 111 slidably held in bearing 112. The ram 111 has a cam roller 114 at its upper end which is engaged by cam 42 for reciprocation thereby.

The plate 110 which reciprocates with the stamping element 27 has mounted thereon, at either side of the stamping element, guide rollers 134, 137 through which the strip 60 is threaded. Return tension springs 118, 118 are mounted between the bearing 112 and the plate 110 to insure upward return of the stamping element 27 after the cam 42 has caused the downward movement of the pressing cycle.

The mechanism for accomplishing relative movement between the stamping elements 26 and 27 preferably causes the reciprocation of stamping element 27 through a pressing cycle. The cam 42, as seen in FIG. 1, is designed to cause rapid downward movement of element 27 into pressing engagement with element 26, maintenance of the pressing engagement for a predetermined period according to predetermined cam design, and rapid vertical return by the springs 118.

Power for the rotation of cam 42 is provided by motor 22 which drives flywheel 119 through a belt drive, the flywheel being keyed to a power shaft 120 which is journaled in the top bearing baacket 101. A drive pinion 121 is keyed to powen shaft 120 and engages gea 122 (FIG. 5) on auxiliary shaft 123.

The cam 42 on shaft 123 is intermittently rotated by means of a single-revolution clutch device, a suitable design being specifically shown in FIGS. 5, 6 and 7. This clutch device includes a hub 124 to which the gear 122 is keyed, the resultant gear and hub assembly freely rotating on auxiliary shaft 123 when the clutch is disengaged, this being the situation when clutch pin 41 is releasably held by the latch 40. A wedging disc 125 is keyed to shaft 123 and disposed within the annular flange of hub 124, this wedging member 125 having three chordal wedging surfaces spaced equally apart by three arcuate surfaces. A clutch member 126 which is freely mounted on shaft 123 has a segmental annular flange 127 which extends between the wedging member 125 and the annular flange on the hub 124. Clutch rollers 128 are disposed in the spaces between the segments of the segmental annular flange 127, these rollers being wedged into frictional driving engagement with the inner surface of the hub flange and the chordal surfaces of the wedging disc 125 when the pin 41 is released from the latch 40. As seen in FIG. 5, the latch 40 is pivoted on a suitable bracket 129 attached to the bearing bracket 101 for pivotal movement by the solenoid 36.

A shaft hub 130 is keyed to shaft 123 and resiliently connected to clutch member 126 by tension springs 131. The springs 131 will be placed under predetermined tension when the latch 40 engages the pin 41 at the completion of one pressing cycle since the inertia of the parts on auxiliary shaft 123 will cause a small degree of continued rotation. The springs 131, therefore, provide a resilient stopping mechanism for cam 42 on shaft 123 along with a triggering mechanism for accomplishing clutch engagement. When latch 40 is lifted, the clutch pin 41 is released and tensioned springs 131 will then rotate the clutch member 126 sufficiently to wedge rollers 128 and thereby cause a coupling of driven gear 122 to auxiliary shaft 123.

The above described mechanism accomplishes the vertical reciprocation of the upper stamping element 27 when solenoid 36 is energized, this being the pressing cycle.

Strip Movement and Control

Prior to each downward movement of the upper stamping element 27, fresh indicia must be advanced into registration with the faces of their respective stamping elements. The mechanism for accomplishing this will now be described, particular reference being made to FIGS. 1–4 and 8–13.

Referring particularly to the schematic view shown in FIG. 4, it will be seen that upper and lower strips 60 and 61 leave their respective rolls 104 and 105 and pass around guides 134—134, then to threading rolls 135—135, across the faces of their respective stamping elements 27 and 26, through threading rolls 136—136, around guides 137—137, around the adjustable eccentrics 138—138, through the space between the finger 64 and its base roller 139 and finger 65 and its base roller 142 respectively, then between the drive roll 140 and its base roll 141, and finally to the take-up rolls 143 and 144.

Preferably all guide and threading members are rollers with ball bearings to reduce friction to a minimum. Also, the drive roll 140 and its base roll 141 are preferably hollow to reduce the moment of inertia of these members. In this manner starting, advancing, and stopping action of the strips is facilitated as the strips are brought to speed quickly and are stopped quickly in response to clutch and brake action. The upper guides 134 and 137 are mounted on plate 110 for movement with the upper stamping element 27. It will be noted that the strips 60 and 61 pass across the faces of their respective elements 27 and 26 in spaced relation to prevent premature heating of the indicia.

As previously described, each strip has a control signal thereon in a predetermined spaced relation from its particular indicia. Preferably this control signal is formed of layers of ink and preferably the control signal is sensed downstream of the stamping elements, as shown in FIGS. 2 and 4.

A lever arm 191 is pivotally mounted on the main frame 100 by a pivot pin 190, the rotatable roller operating as the contact finger 64. The strip 60 passes between the contact finger 64 and a base roller 139 on the main frame 100. Similarly lever arm 145 is pivotally mounted on frame 100 by pivot pin 146, with a roller operating as contact finger 65. The strip 61 passes between finger 65 and a base roller 142 on the main frame 100.

As seen in FIG. 4, the upper stamping element has almost reached the lower stamping element for the pressing engagement, and the strip 60 positioned under the element 27 is spaced therefrom prior to pressing contact to prevent premature melting of the ink. The indicium has been enlarged for purposes of illustration, and it will be noted that the indicia on the upper strip 60 and the lower strip 61 are controlled by the second control signals downstream of the strips. It will further be noted that there is no indicium between the control signals downstream of the stamping elements, as this indicium has previously been placed on articles.

As previously explained, the stamping operation will proceed upon placing an article between the stamping elements and closing the trigger switch 31, this operation of the switch being either manual or automatic upon delivery of an article over the lower stamping element by manual means or automatic conveyor systems.

Upon removal of the article, the circuit to the control system is broken and the brakes on the upper and lower strip-moving means are released and the clutches are engaged, thereby enabling the drive rolls 140, 140 to draw their strips 60, 61 across the faces of the stamping elements 27, 26. When the next control spots arrive at the sensing fingers 64, 65, the fingers will be moved outwardly away from their base rollers 139, 142, thereby closing the sensing switches 51, 56 and setting the brakes. The upper and lower strip moving systems operate independently of each other.

The moving means for the upper and lower strips are similar to each other, each involving a friction clutch type driving mechanism and a brake. As seen in FIG. 3, a chain 147 from a sprocket on the end of main shaft 120 continually transmits power from motor 22 to stub shaft 149 in the main frame 100. A bevel pinion 150 mounted on the stub shaft 149 engages a bevel ring gear 151 which is part of an integral unit including a ring spur gear 152 and a pulley 153 (FIG. 12), the unit being mounted for free rotation on the upper drive roll shaft 154. The pulley 153 through belt 155 (FIG. 3) causes suitable rotation of a slip drive 156 on the upper take-up roll 143.

The bevel pinion 150 continually rotates the upper bevel ring gear 151 and the spur gear 152 of the upper unit meshes with the spur gear 157 of the lower unit to supply the necessary rotational movement for the lower strip drive, a suitable belt 158 being provided about its pulley for rotating a slip drive 159 on the lower take-up roll 144.

The brake and clutch mechanisms for the upper and lower drive rolls are similar except for the bevel gear which is not present on the lower unit. The drive roll shaft 154 is shown cut off at the point where it passes through the main frame (FIG. 12). It has a first brake drum 160 fixed thereto by means of a set screw. A second slidable brake drum 161 abuts brake drum 160 and is prevented from relative rotational movement around shaft 154 by means of pin 162 which passes through a longitudinal slot 163 in the sleeve extension 164 of the second slidable brake drum 161, this sleeve extension passing outwardly through a thrust bearing 165. The gear unit includes gear 152, pulley 153, gear 151 and abuts against the face of the clutch assembly 166 having a clutch plate 168 spring-biased against the face of the bevel gear 151 by means of spring 167. Adjustable knob 169 at the end of shaft 154 controls the tension in compression spring 167.

A brake band 170 (FIG. 13) is pivotally mounted to the frame 100 by pin 171 and is forced into frictional braking engagement with the brake drums 160, 161 by means of bell crank 172 which is pivotally mounted to the frame by pin 173. The long leg of the bell crank 172 is directly affixed to its brake solenoid 53 or 58 (FIG. 1) by rod 174 and when its solenoid is energized the bell crank is pivoted to force the brake band into firm frictional engagement with the brake drums 160, 161. It will be noted that before the brake band 170 contacts the brake drums 160, 161, a clutch release pin 175 enters the annular groove 176 between the brake drums and forces the slidable drum 161 outwardly, this in turn forcing the clutch plate 168 away from the face of the bevel gear 151 against the pressure of spring 167. In this fashion the clutch is disengaged just prior to the application of the brake, thereby enabling more effective and rapid stopping of the drive roll.

To prevent relative movement between upper strip 60 and stamping element 27 during downward movement thereof, a clamp means 175 is provided at one side of the upper stamping element 27 for clamping the strip 60 in place thereby guaranteeing the maintenance of accurate registration of the indicia with the face of the stamping element. As seen in FIGS. 8 and 9, the threading roll 135 is rotatably mounted in a spring-mounted base 176 and the U-clamp 175 is slidably mounted on the ends of the base 176 by means of elongated slots 177 through which mounting screws 178 pass.

The U-clamp 175 is biased toward upward clamping position by two tension springs 179 affixed to the base 176. When the stamping element 27 is in its uppermost position, a release lug 180 mounted by bracket 181 on bearing 112 (FIG. 2) causes the U-clamp 175 to be downwardly extended against the tension of the springs 179. Immediately upon downward movement of the stamping element 27, the U-clamp 175 leaves the lug 180 and the springs 179 pull the U-clamp into engagement with the strip 60, thereby preventing movement of the strip across the face of the stamping element during the pressing cycle.

It will be noted that the base of the U-clamp 175 has two raised bosses 182 at either side which actually clamp the strip 60 against the roll 135. Also it will be noted that a central groove 183 is provided in the U-clamp for passage of a control signal and for housing a control signal should certain indicia and control signal arrangements place a control signal at this position during the pressing cycle.

The clamp means such as U-clamp 175 may be placed on either side of the moving stamping element; preferably it is placed on the entrance side. Extensive tests have shown that clamp means at both sides of the stamping element result in a tearing of the strip requiring shut-down of the machine for rethreading. The lower U-clamp 90 on the entrance side is also spring biased away from the strip 61 and is pressed into gripping engagement therewith when contacted by the upper U-clamp 175 as seen in FIG. 11. Suitable holding lugs and a signal groove may be provided if desired, similar to U-clamp 175.

Stamping elements 26 and 27 are spring mounted on their respective supports by means of bolts and springs as seen in FIGS. 8–11. The elevation of the fixed stamping element 26 may be varied by varying the number of spacer plates 108 thereby controlling the spring pressure between the stamping elements during the stamping operation. It will be obvious that suitable adjusting means of other types may be employed if desired.

As seen in FIGS. 2 and 4 the upper strip 60 and the lower strip 61 pass from guides 137—137 to adjustable eccentrics 138—138. Each eccentric 138—138 is rotatably mounted on a bolt passing through the main frame 100 to enable adjustment of the eccentric to desired positions. In this manner various indicia and control spot systems may be accurately adjusted on the machine so that the indicium is accurately positioned at its respective stamping element when the control spot is at its respective control finger. In practice, this dimension is maintained as close to an established standard as possible, but it will be understood that temperature and humidity conditions will cause slight variations in the dimensions of a roll of transfer strips. The eccentric 138 provides a fine adjustment which will compensate for such variation from the established standard.

It has further been found that rapid braking and driving action for the strip movement can be attained by employing the brake means shown in FIGS. 17 and 18 wherein a first brake drum 200 is fixedly mounted on the strip driving shaft 154 by means of set screw 201, a second slidable brake drum 202 is mounted adjacent the fixed brake drum 200 on the shaft 154, this drum being mounted for restricted longitudinal movement by means of a pin 203 passing through shaft 154 and outwardly through elongated slots 204 in a sleeve extension 205 of the slidable brake drum 202. As previously described, with regard to the brake means in FIG. 13 the sleeve extension 205 slides longitudinally along shaft 154 to disengage the clutch just prior to the application of the brake band 206 to the annular surfaces of the fixed and slidable brake drums 200 and 202. It will be noted that the clutch release pin 207 upon inward movement toward the brake bands engages only one slanted surface 208 on the slidable brake drum 202 thereby causing firm and positive movement and accomplishing declutching upon the slightest movement of the brake bell crank 209. Fast stopping and starting of the transfer strips is accomplished.

To facilitate application of long indicia along the length of a sock as well as short indicia across the sock, upper and lower rotatable mounting means for stamping elements are provided. Each stamping element would be mounted on the upper or lower mounting means in substantially the same manner and for purposes of description, a stamping element on the base 106 will be described. Referring to FIGS. 19, 20 and 21 it will be noted that a stamping element 300 is resiliently mounted by four posts 301 and spring assemblies to a rotatable table 302, the spring mounting of the stamping element being similar in construction and operation to that previously described and shown in FIGS. 8–11. The rotatable table 302 is mounted for rotation on a shaft 303 extending upwardly from the base 106 and through spacers 108. A latch means 304 is slidably mounted on the table 302 and includes a central elongated slot 305 through which shaft 303 projects, the shaft acting as a guide for reciprocating movement of the latch. A retaining nut 306 at the top of the shaft 303 retains the table and latch means in position on the base 106. One end of the latch plate 307 is affixed to the table by a bolt 308 passing through an elongated bolt opening 309 and threaded into the table 302, the bolt opening 309 and the elongated slot 305 being longitudinally aligned along the latch means to enable reciprocating movement of the latch means relative to the table. A machine screw 310 mounted on the latch plate 307 connects a spring 311 extending from the shaft 303 to the latch means to bias the latch plate 307 to the latched condition shown in FIG. 19. A suitable handle 312 is attached to the latch plate 307 for actuation. The table 302 has an arcuate slot 313 partially around the shaft as center through which projects a stop pin 314, the stop pin being fixedly mounted in the base 106. The latch plate 307 in latched condition extends over the arcuate slot 313 and abuts the stop pin 314 thereby locking the table in a first position suitable for application of short indicia across a sock.

When it is desired to rotate the stamping element to present the longer dimension of the stamping element for application of long indicia along the length of a sock, the handle 312 is pushed inwardly, thereby moving the outer arcuate edge of the latch plate 307 inwardly of the arcuate slot 313 so that the table may be rotated 90 degrees. The stop pin 314 is of a height equal to the thickness of the latch plate 307; the handle 312 which is mounted on top of the latch plate 307 passes clear of the top of the pin 314 when the table 302 is rotated.

FIG. 20 shows the position of the table and latch mechanism after a rotation of 90 degrees from the position shown in FIG. 19.

The stamping element shown in FIG. 19 is provided with transfer strip threading members 315 at all four sides, the width of the stamping element being, for example, about 3 inches and the length of the stamping element being about 4½ inches. The threading members otherwise are similar to those shown in FIGS. 8–11.

Friction brakes 98 are used on the axles of the supply rolls 104 and 105, these friction brakes applying a counter torque against the unwinding of the rolls whereby when the strips are stopped, the rolls 104 and 105 will be given a return or reverse rotation to prevent accumulation of slack due to inertia of the rolls. In this fashion a taut entry condition is maintained on both the upper and lower transfer strips.

When applying indicia to socks mounted on standard cardboard forms, automatic or hand placement of the mounted sock between the elements 26 and 27 has proved satisfactory. When applying indicia to socks not mounted on standard cardboard forms, a sock holder similar to a form is required. A satisfactory design for such a holder involves a form pivotally mounted for movement from in front of the machine into the machine between the stamping elements 26 and 27. Suitable camming of the rotating sock holder enables elevation of the holder as it passes over the lower U-clamp 90. The form can then be lowered by a cam action and held in aligned position by a lock mechanism.

Added positioning and actuating switches may be substituted for the disclosed switch 31 when a more automatic or precise positioning of the sock is desired. Also it will be readily appreciated that a number of the disclosed stamping elements may be aligned in parallel so that a series of transfers may be applied in a single operation. Also substitution of the transfer strips to enable change of indicia design can be accomplished through suitable mechanical arrangements.

By confining the heat required for melting the indicia to the indicia at the element 26 or 27 premature softening of transfers upstream will be prevented. Softening of the control signal or spot will likewise be prevented, thereby enabling a more positive sensing and control action downstream of the stamping station. Ray heating devices, now used for instantaneous cooking which do not heat up the food container, offer a suitable type heating unit.

The system shown in FIG. 1 is for purposes of description of the instant invention and it will be appreciated that changes in the details shown in FIG. 1 within the spirit of the instant invention can be accomplished by those skilled in the art. For example, movement of both stamping elements may be accomplished, a single cam bar with two operating edges may be substituted for the two separate cam bars shown, and various other changes may be made. It has been found most satisfactory under certain operating conditions to relocate the flywheel (FIGS. 2-3) on the other side of the apparatus to provide a more balanced structure. These figures, as well as many others, are, of course, functions of design requirements for a particular machine.

I claim:

1. In a machine for simultaneously applying indicia carried by first and second strips to opposite faces of an article, a control signal for each indicium spaced a constant distance therefrom along its respective strip, first and second stamping means, said stamping means being mounted for relative movement toward and away from each other, first and second moving means for separately and independently moving their respective strips between adjacent surfaces of said stamping means, the indicia bearing sides of the strips facing each other as they move between the stamping means, first and second sensing means spaced from said stamping means for engagement with their respective strips to identify independently control signals on said strips, the paths for the strips between their respective stamping means and sensing means being equal in length to said constant distance between a control signal and its related indicium, first and second brake means actuated by their respective sensing means sensing their respective control signals to independently render their respective moving means inoperative whereby said strips are stopped with their related indicia located between said adjacent surfaces of said stamping means, pressing means connected to one of the stamping means for causing relative movement of said stamping means toward and away from each other whereby the previously positioned indicia on the first and second strips are simultaneously applied to opposed faces of the article, a trigger switch for actuating said pressing means, a neutralizing means, said trigger switch also functioning to activate said neutralizing means, said neutralizing means being effective for a preselected period of time after release of said trigger switch to release said first and second brake means to enable said first and second moving means to move the control signals on said first and second strips away from their respective sensing means and allow movement of the next indicia to said stamping means.

2. In a machine as defined in claim 1 and wherein said neutralizing means includes a safety switch having a cam bar of a predetermined length which establishes the preselected period of time.

3. In a machine as defined in claim 1 and wherein said neutralizing means includes a safety switch and a neutralizer switch in series therewith, the neutralizer switch being adjustable to provide the preselected period of time.

4. In a machine as defined in claim 1 and including clamp means for maintaining proper positioning of an indicium at the surface of its stamping means during movement thereof by said pressing means, said clamp means being mounted at one side of a movable stamping means for movement therewith during the pressing operation, said clamp means including means for gripping a strip upon initial closing movement and for releasing said tape upon final opening movement of the movable stamping means.

References Cited in the file of this patent

UNITED STATES PATENTS

| | | |
|---|---|---|
| 2,516,487 | Schlicksupp | July 25, 1950 |
| 2,628,929 | Persoon et al. | Feb. 17, 1953 |
| 2,645,870 | Smith et al. | July 21, 1953 |
| 2,661,290 | Rackett | Dec. 1, 1953 |
| 2,721,821 | Hoover | Oct. 25, 1955 |
| 2,739,890 | Yutzy et al. | Mar. 27, 1956 |
| 2,777,354 | Stickney et al. | Jan. 15, 1957 |
| 2,852,670 | Jacques et al. | Sept. 16, 1958 |
| 2,870,429 | Hales | Jan. 20, 1959 |
| 2,877,586 | Chenery et al. | Mar. 17, 1959 |